April 18, 1933.  J. H. BUTLER  1,903,977
DELIVERY TRUCK CONTROL
Filed May 25, 1931   3 Sheets-Sheet 1
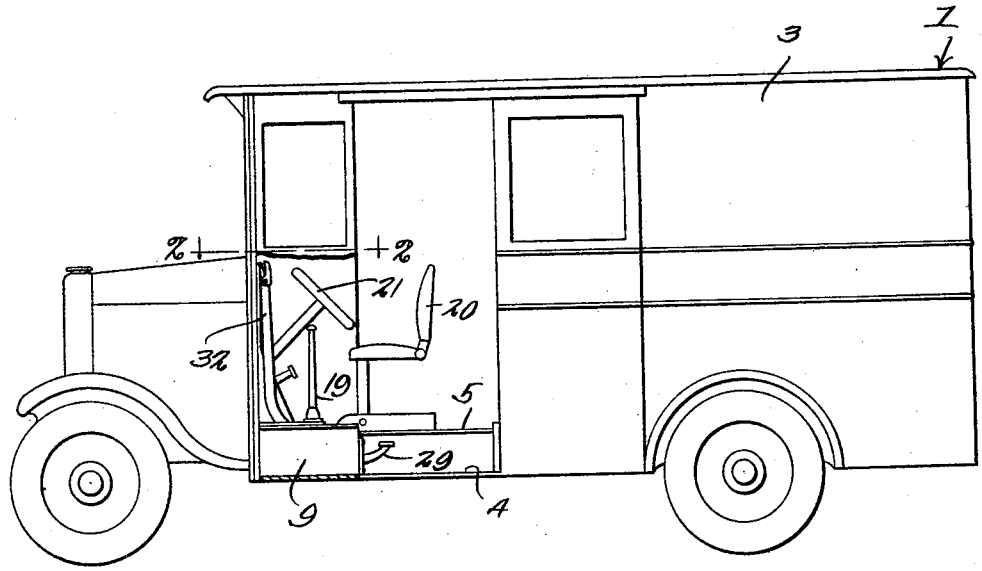
Fig. 1.
Fig. 2.
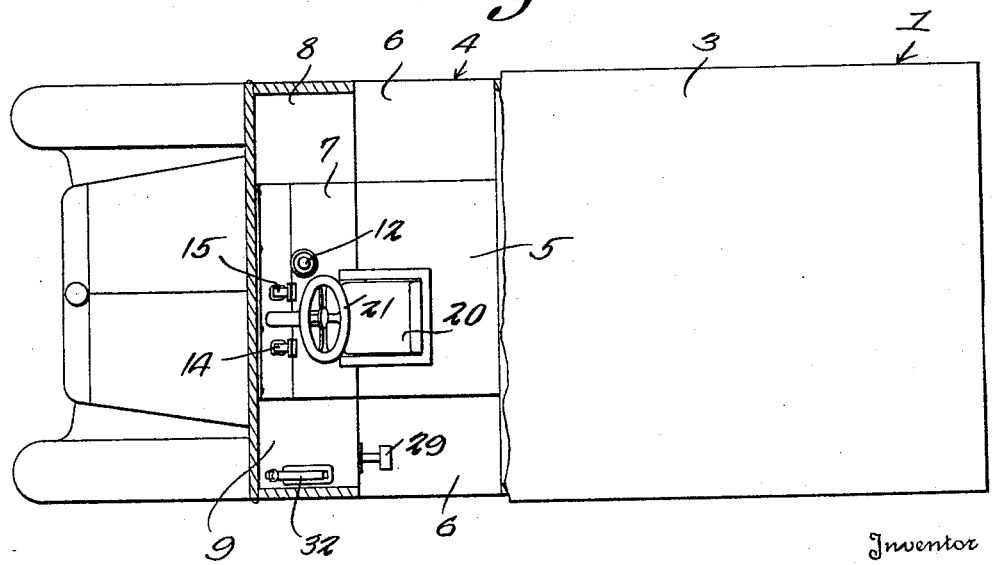
Inventor
J. H. Butler
By C. A. Snow & Co.
Attorneys.

April 18, 1933.  J. H. BUTLER  1,903,977
DELIVERY TRUCK CONTROL
Filed May 25, 1931   3 Sheets-Sheet 2
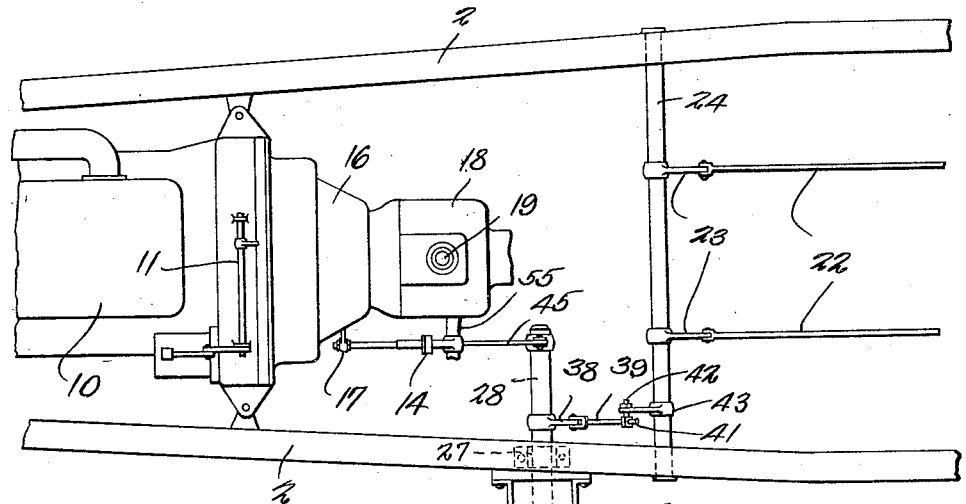
Fig. 3.
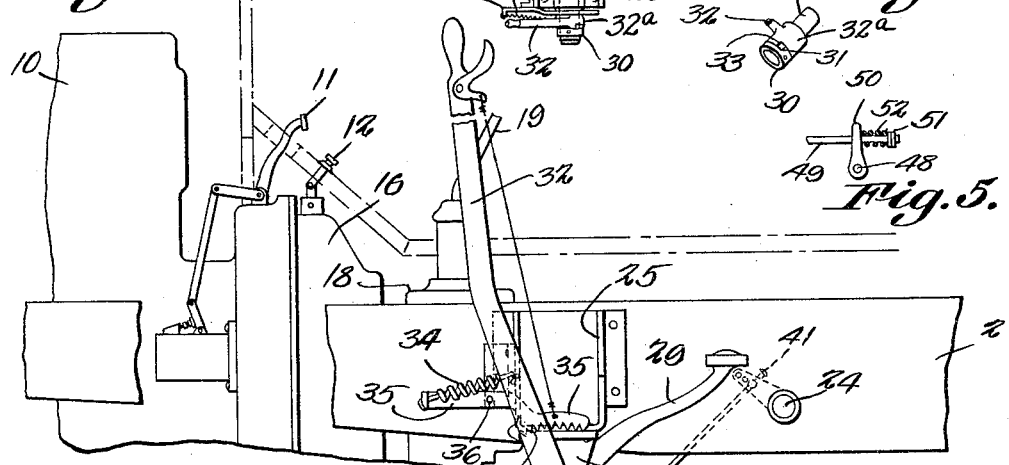
Fig. 6.   Fig. 4.   Fig. 5.
Fig. 7.
Inventor
J. H. Butler
By C. A. Snow & Co.
Attorneys.

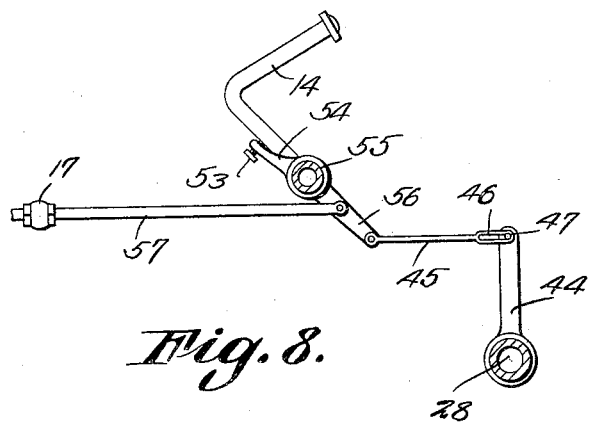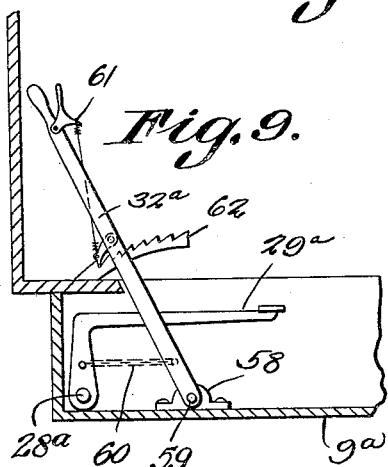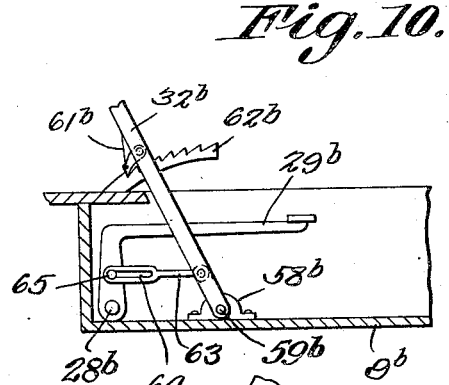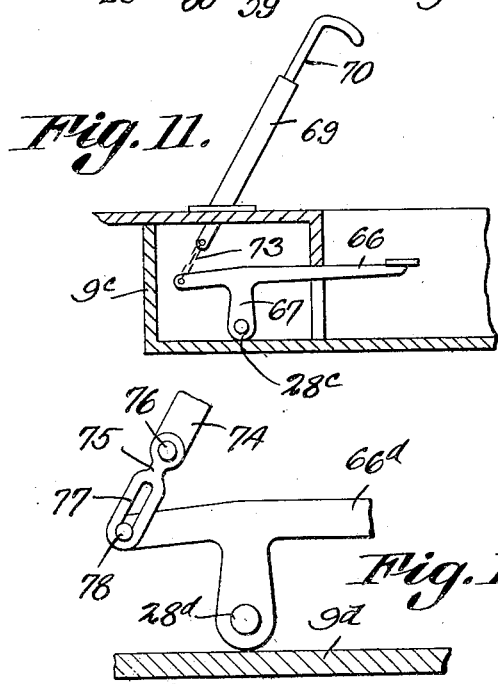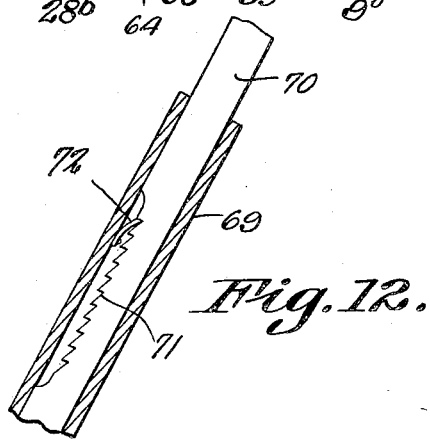

Patented Apr. 18, 1933

1,903,977

UNITED STATES PATENT OFFICE

JAY H. BUTLER, OF NEWARK, OHIO

DELIVERY TRUCK CONTROL

Application filed May 25, 1931. Serial No. 539,909.

This invention aims to provide, in a motor propelled vehicle, a novel means whereby the brake, the clutch, and the gear shift may be controlled conveniently, from a single point of force application, at one side of the vehicle.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows, in side elevation, a motor propelled vehicle equipped with the device forming the subject matter of this application;

Figure 2 is a section on the line 2—2 of Figure 1, the view being, for the most part, a top plan;

Figure 3 is a top plan view of the operating mechanism;

Figure 4 is a perspective view disclosing other of the connections;

Figure 5 is a side elevation showing another of the connections;

Figure 6 is a side elevation of the operating mechanism;

Figure 7 is a transverse section showing one of the pedals, one of the levers, and attendant parts;

Figure 8 is a sectional view showing, in elevation, certain parts which cooperate with the gear shift;

Figure 9 is a sectional view showing a modification;

Figure 10 is a sectional view showing another modification;

Figure 11 is a sectional view showing another modification;

Figure 12 is a vertical section disclosing a part of the structure which appears in Figure 11;

Figure 13 is a fragmental elevation disclosing another modification.

The device forming the subject matter of this application can be mounted on vehicles of various kinds, but in Figures 1 and 2 there is shown a motor propelled vehicle 1, comprising a frame 2 carrying a body 3 having a depressed transverse passageway 4 across which extends a raised portion 5 defining depressed platforms 6 at each side of the vehicle. The foot board 7 is located in front of the raised portion 5 and there are box-like casings 8 and 9 at each end of the foot board 7 and in front of the platforms 6. The engine is marked by the numeral 10, and the numeral 11 designates the starter pedal and mechanism connected therewith. The throttle control is shown at 12, and the clutch pedal at 14. The numeral 15 marks the service brake pedal. The clutch casing is shown at 16, and the clutch-operating member is designated by the numeral 17. The gear shift casing can be seen at 18, and the numeral 19 refers to the gear shift lever. A seat 20 is mounted on the raised portion 5 of the vehicle body, in proper relation to the steering wheel 21. The brake rods 22 appear in Figure 3 and are connected to arms 23, secured to a transverse shaft 24, mounted to rock in the frame 2.

A laterally projecting bracket 25 is mounted on the frame 2, in the casing 9. A depending bearing 26 is mounted on the bracket 25, and a depending bearing 27 is mounted on the frame 2.

In the bearings 26 and 27, a shaft 28 is mounted to turn. A pedal 29 extends rearwardly from the shaft 28 and is secured thereto, the pedal 29 projecting backwardly out of the casing 9, above one of the platforms 6. A collar 30 is secured to the shaft 28 (Figures 4, 6 and 7) and has a shoulder 31. A lever 32 is provided and has a hub 32a forming means for mounting the lever, to swing on the shaft 28 and the lever extends upwardly out of the casing 9. The lever 32 has a shoulder 33, adapted to cooperate with the shoulder 31 on the collar 30. A latch 35 is fulcrumed intermediate its ends, as shown at 36, on the bracket 25. A pull spring 34 connects the forward end of the latch 35 with the lever 32. The spring 34 tends to swing the upper end of the lever 32 forwardly, and the spring tends, also, to swing down the lower end of the latch 35, so that the same will cooperate with a keeper 37 mounted on the lever 32.

On the shaft 28, there is a rearwardly and downwardly inclined arm 38, located within the frame 2. A rearwardly extended connecting rod 39 is adjustably pivoted at 40 to the arm 38 and extends upwardly from the arm. On the rear end of the rod 39 there is a head 41. The rod 39 has limited sliding movement in a short shaft 42, mounted to rock on a forwardly extended arm 43 secured to the shaft 24.

On the inner end of the shaft 28 there is an upstanding arm 44. The numeral 45 designates a forwardly extended link, provided in its rear end with a slot 46 receiving a pivot element 47 on the arm 44.

If the operator wishes, he can resort to the structure shown in Figure 5, as a modification. In Figure 5, the shaft 48 represents the shaft 28, and the link 49 represents the link 45. The arm on the shaft 48 is marked by the numeral 50, and the link 49 has limited sliding movement in the arm 50. On the rear end of the link 49 there are abutment nuts 51. A compression spring 52 is interposed between the abutment nuts 51 and the arm 50.

The combined clutch and gear shift pedal 14 is mounted to swing on the shaft 55 which extends into the gear shift casing 18 and controls the gear shifting mechanism. The pedal 14, however, is adapted to abut against an adjusting screw 53, threaded into an arm 54 secured to the shaft 55. The shaft 55 has a depending arm 56, to which is pivoted the rear end of a link 57, having its forward end connected to the clutch operating member 17. The forward end of the link 45 is pivoted to the arm 56 on the shaft 55.

In practical operation, the driver of the car, standing on one of the platforms, can step on the pedal 29, thereby rocking the shaft 28, and causing the arm 38 to actuate the connecting rod 39, the connecting rod 39 operating through the short shaft 42 and the arm 43 to rotate the shaft 24, the arms 23 on the shaft 24 actuating the rods 22 to set the brakes. When the shaft 28 is rocked by means of the pedal 29, the shoulder 31 on the collar 30 (Figure 4) which is secured to the shaft 28, moves away from the shoulder 33 on the lower end of the lever 32, and the lever 32 is not drawn rearwardly. If the operator wishes, he can rotate the shaft 28 by means of the lever 32, the shoulder 33 of the lever then engaging the shoulder 31 on the shaft 28. When the shaft 28 is rotated by means of the lever 32, the latch mechanism 35 can be operated to engage the keeper 37, so as to hold the brakes set. When the shaft 28 is rotated by means of the pedal 29, the lever 32 can be swung back until the shoulder 33 of the lever engages the shoulder 31 on the shaft 28, and if, then, the latch mechanism 35, which is carried by the bracket 25, is engaged with the keeper or pin 37 on the lever 32, the shaft 28 will be held against rotation and the brakes will be held set. When the shaft 28 is rocked, as aforesaid, the arm 44 of Figure 8 acts through the link 45 and the lower arm 56 on the shaft 55, to rotate the shaft and shift the gears in the casing 18. From the arm 56, motion is transmitted by the link 57 to the clutch operating member 17, and the clutch is thrown out. The construction is such that, from a single point of force application, the brakes can be set, the clutch thrown out, and the gear shift or transmission placed in neutral.

In the modification shown in Figure 9, parts hereinbefore described are designated by numerals previously used, with the suffix "a". The shaft 28a carries the pedal 29a which is of angular form, and the lever 32a is pivotally mounted as shown at 59, on a bracket 58 mounted on the casing 9a. A flexible element 60, such as a chain, connects the pedal 29a with the lever 32a. The lever 32a has a latch mechanism 61, adapted to cooperate with a segment 62 carried by the top of the box-like casing 9a. The operation of the structure shown in Figure 9 need not be described in detail, further than to state that the structure provides two means for operating the shaft 28a, as hereinbefore described.

In Figure 10, parts hereinbefore described have been designated by numerals previously used, with the suffix "b". In this form of the invention, the pedal 29b is connected to the lever 32b by a link 63 which is pivoted to the lever 32b, the link being provided in its forward end with a slot 64 having limited movement on a projection 65 carried by the pedal 29b.

In Figures 11 and 12, parts hereinbefore described have been designated by numerals previously used, with the suffix "c". The pedal 66 is T-shaped, and has a depending shank 67 which is mounted on the shaft 28c. A rearwardly inclined socket 69 is secured to the top of the casing 9c. In the socket 69, a cane-like slide 70 is mounted for longitudinal reciprocation, the slide having a rack 71 located within the socket 69 and adapted to cooperate with a spring latch 72 carried by the socket 69. The lower end of the slide 70 is connected by a chain 73, or other flexible elements, to the forward end of the pedal 66. The shaft 28c can be operated by means of the pedal 66, or the operator can pull up on the slide 70, and operate the shaft 28c. When the slide 70 is pulled upwardly, it is held in position by the engagement between the latch 72 and the rack 71. The slide 70 is circular in cross section, and it can be rotated on an axis to disengage the rack 71 from the latch 72, and then the slide 70 can be permitted to move downwardly.

In Figure 13, parts hereinbefore described have been designated by numerals previously used, with the suffix "d". The pedal 66d is operated by a slide 74 or the like, to which a link 75 is pivoted at 76, the link having a slot 77 receiving a projection 78 of the forward end of the pedal 66d.

Having thus described the invention, what is claimed is:—

1. In a motor propelled vehicle having a brake, a clutch, and a transmission, mechanism for setting the brake, throwing out the clutch, and putting the transmission into neutral, said mechanism comprising a shaft, means for supporting the shaft for rotation, means for connecting the shaft with the clutch, means for connecting the shaft with the transmission, means for connecting the shaft with the brake, a pair of operating members, the pair including a pedal and a hand lever, the shaft and an operating member of the pair constituting coacting parts, one of said operating members being secured to the shaft, and means for mounting the other of said operating members for movement with respect to the shaft, a lost motion connection between said other of the operating members and one of said coacting parts, whereby the operating member which is secured to the shaft can be actuated independently of the operating member which is movable with respect to the shaft, the lost motion connection comprising relatively movable parts, the operating member which is movable with respect to the shaft being so movable in order to bring the said parts of the lost motion connection together, thereby restraining the operating member which is fixed to the shaft, and latch mechanism cooperating with the hand lever, to hold the hand lever releasably against movement.

2. In a motor propelled vehicle having a brake, a clutch, and a transmission, mechanism for setting the brake, throwing out the clutch, and putting the transmission into neutral, said mechanism comprising a shaft, means for supporting the shaft for rotation, means for connecting the shaft with the clutch, means for connecting the shaft with the transmission, means for connecting the shaft with the brake, a hand lever, means for mounting the hand lever for swinging movement independently of the shaft, lock mechanism cooperating with the hand lever to hold the hand lever releasably against movement, a pedal connected to the shaft, and a connection between the hand lever and the pedal, said connection having a maximum length, and comprising parts which are relatively movable to permit the maximum length of the connection to be reduced, and to permit the pedal to move with respect to the hand lever.

3. A motor propelled vehicle embodying a frame, a clutch mechanism having a laterally projecting part, a gear shift mechanism having a laterally projecting shaft, a second shaft disposed transversely of the frame and journaled thereon, means on the second shaft whereby it may be actuated directly by an operator, a brake mechanism operatively connected to the second shaft, arms on the second shaft and on the shaft of the gear shift mechanism, a link pivoted to one arm, means for connecting the link for limited sliding movement to the other arm, a link connected to said first arm and to the laterally projecting part of the clutch mechanism; cooperating parts comprising a second arm secured to the shaft of the gear shift mechanism, and a member under the control of an operator and mounted to swing for adjustment on the shaft of the gear shift mechanism; and an adjustable abutment carried by one of said cooperating parts and engaging the other of said cooperating parts.

In testimony that I claim the foregoing as my own, I have hereto affixed my signature.

JAY H. BUTLER.